Aug. 5, 1930.   E. D. BIERETZ ET AL   1,772,029
SEMIAUTOMATIC GEAR ENGAGING TRANSMISSION
Filed April 2, 1929   2 Sheets-Sheet 2
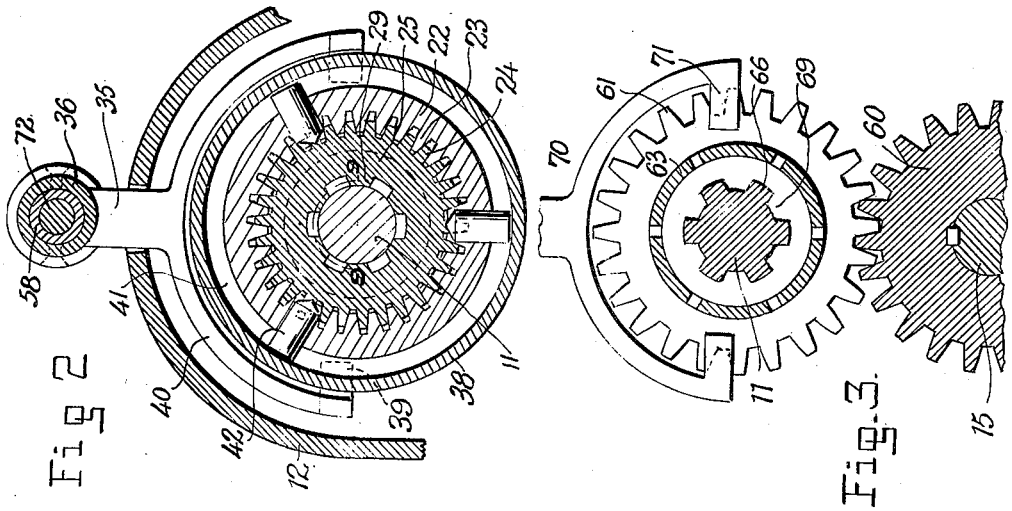
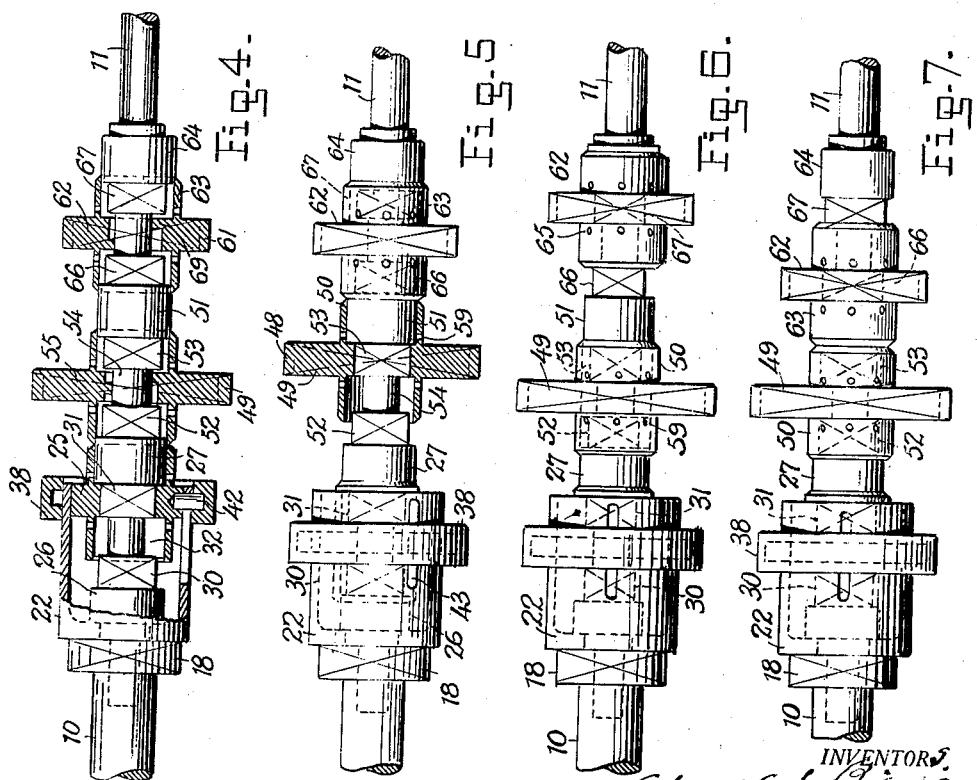
INVENTORS.
Edward D. Bieretz
BY John J. Tigel
ATTORNEY.

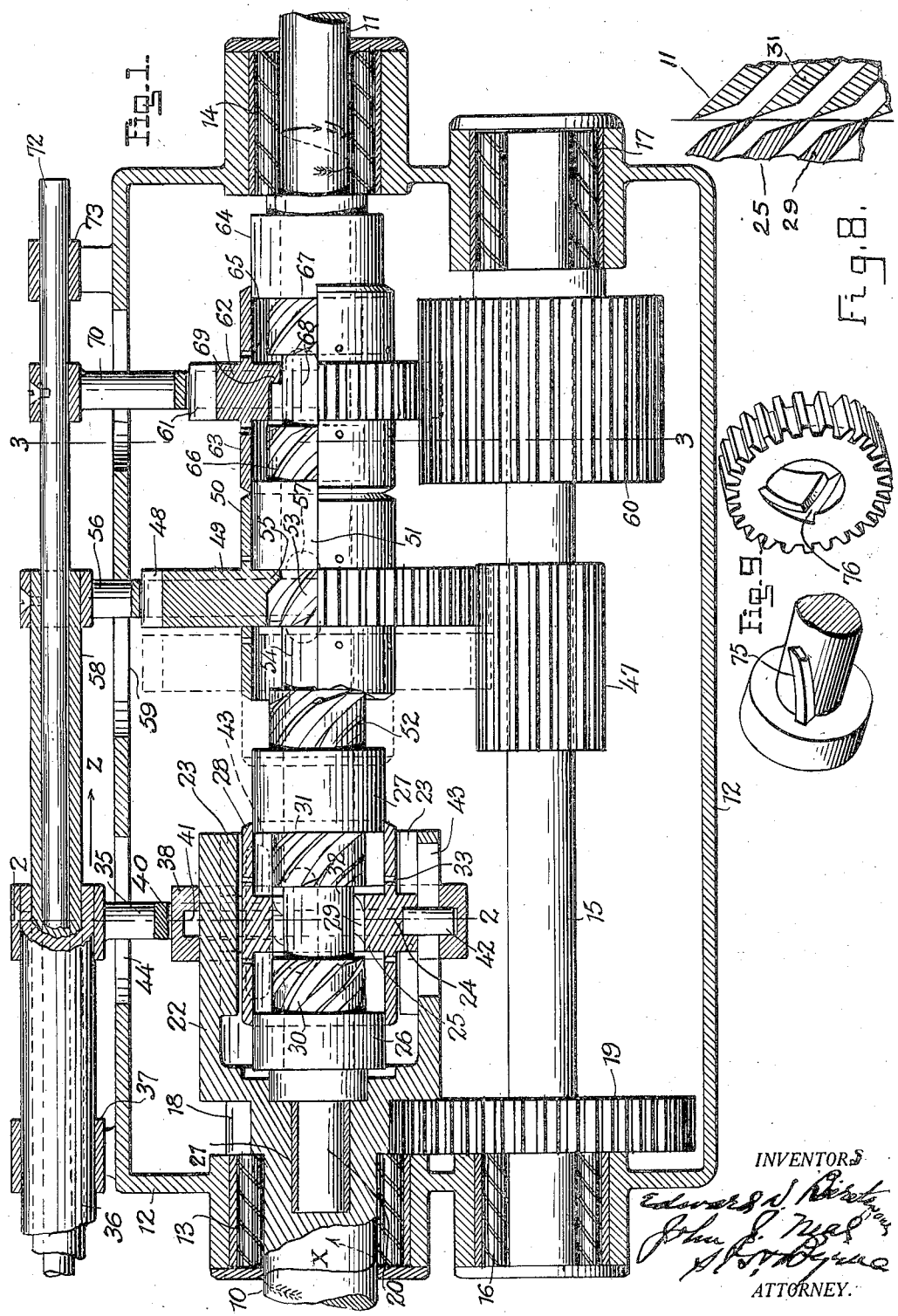

Patented Aug. 5, 1930

1,772,029

UNITED STATES PATENT OFFICE

EDWARD D. BIERETZ AND JOHN J. NEAL, OF BALTIMORE, MARYLAND

SEMIAUTOMATIC GEAR-ENGAGING TRANSMISSION

Application filed April 2, 1929. Serial No. 351,992.

The present invention relates to gear transmissions applicable to any and all types of motor driven machinery, and consists in the combinations and arrangements of elements hereinafter described and particularly set forth in the accompanying claims.

The primary object of the invention is to furnish a power transmission for motor vehicles which readily permits changing speed without releasing the clutch. This is particularly advantageous when the transmission is furnished on an automobile, as it will then be possible, when traveling in forward direction and under power, to bring into engagement any one of the different speed gears selectively or progressively, according to the arrangement of the gear shifting device.

In ordinary automobile transmissions using spur gears, the gears must be properly ground or fitted together in order to readily facilitate the exchange from one speed to another. It requires, however, a great deal of practice and a certain knack in operating the shift lever to change from one speed to another, without causing shock or jerking of parts, all of which causes unnecessary wear of the gears and delay in operation. There must always be coordination between clutch, accelerator and gear shift.

As all the spur gears used in the present invention always remain in mesh, no waiting is required for slipping them into each other. Nor is there any necessity for grinding them together and for the same reason no close fitting. Consequently time is gained in operation, shocks are avoided and manufacture is cheapened.

The fact that the gears are never out of mesh has the advantage of making coasting in an automobile very safe, because the danger of not being able to bring the car under control (through inability to engage the gear teeth) is completely avoided by the use of our transmission.

Another advantage to be found in the use of our transmission is that it very readily permits of use of the engine as a brake when coasting, by direct connection between the rear wheels and the engine through the driven and driving shafts; or selectively through the said shafts in cooperation with any of the different speed gears, and without disengaging the clutch.

When used as an automobile transmission operating under power in forward direction on steep up-grades, any one of the lower speed gears may be easily resorted to without releasing the clutch by pre-setting the gear shifting device for one of the desired speeds, and momentarily reducing, and then immediately increasing, the engine speed by means of the throttle.

This transmission may be arranged for multiple speed forward with multiple speed reverse; or for multiple speed forward with one speed reverse, as found most desirable for its different uses.

As the couplings consist of spiral keys, it is impossible to lock or jam the gears or have more than one in operation at a time, either in the forward power position or the forward brake position, because one set of spiral keys will always back off any one of the other spirals operating in the same direction, into neutral position. It is also practical to vary the pitch of the spirals proportionate to the gear ratio of the respective gears they operate so that it will be impossible to have the forward power spiral keys of any gear engage while the forward brake spiral of any gear is engaged or vice versa.

The device is equally suitable for mechanical or electrical control, which however is needed only for engaging and not for disengaging the desired gear. Because of the very short travel of the spiral coupling and the fact the spiral keys will complete the operation, electric control is especially advantageous.

In the event of a stalled automobile engine and in order to facilitate instant release of all speed gears, it is preferable to arrange the reverse gear on the engine side of the transmission, and for the purpose of silencing the shifting operation, dash pots are provided for all the spiral couplings. The gear shifting device may be connected with the accelerator pedal, so that, when the latter is released, the gears will automatically assume neutral position, thus enabling the car to coast absolutely free from the engine.

In the accompanying drawings one embodiment of the invention is illustrated.

Figure 1 is a side elevation and part section of the transmission.

Figure 2, a vertical section along line 2—2 of Figure 1.

Figure 3, a similar view taken along line 3—3 of Figure 1.

Figure 4, a top plan view, partly in section, showing the transmission set for high speed.

Figure 5, a similar view with the transmission set for low speed.

Figure 6, a top plan view of the transmission set for second speed.

Figure 7 shows a top plan view of the transmission set for running the engine by the ordinarily driven shaft through the second speed gear.

Figure 8 shows a development of the spiral key coupling; and,

Figure 9 is a modified construction of the spiral key coupling.

In the different figures of the drawings, 10 represents the driving shaft and 11, the driven shaft which connects with the differential when used on an automobile. The driving shaft 10 is preferably carried in a roller bearing 13 mounted in a gear casing 12; and shaft 11 is carried in a roller bearing 14 in the same casing. The engine end 20 of the drive shaft is journalled in a recessed bearing 21 in the end of the driving shaft as indicated. Below these shafts is located an auxiliary or intermediary shaft 15, also mounted in roller bearings 16, 17 of the housing.

Integral or otherwise secured to the main or driving shaft 10 is a pinion 18 which is permanently in mesh with a gear 19 on the counter shaft 15, and of a size to reduce the speed of the auxiliary shaft below that of the main or driving shaft. The latter has an extension 22 beyond the pinion 18 forming a cylindrical cup or socket provided with internal teeth or splines 23 which permanently engage corresponding teeth or splines 24 on a sleeve-like coupling member 25 which accordingly always revolves with the main shaft 10, but is adapted to be axially displaced as regards the main shaft along its teeth 23. Accordingly the length of the cup teeth 22 is fully three times that of the sleeve teeth 24 which are placed medially between the ends of the sleeve, permitting the same axial displacement in both directions.

On the driven shaft 11 are a pair of bosses or collars 26 and 27 rigidly connected therewith and spaced apart a distance somewhat less than the length of the sleeve portion 28 of the coupling member 25 and having the same external diameter as the internal diameter of said sleeve portion. In this manner it is possible for the sleeve portion to engage both collars 26, 27, simultaneously when the coupling member 25 stands in its central or neutral position as indicated in Figure 1.

Within the sleeve portion of the coupling member 25 are formed integral spiral teeth or flat keys 29 and on the driven shaft 11 are provided corresponding male spiral keys 30 and 31 adjacent to the bosses or collars 26, and 27, respectively, in order to form a gap 32 between them of a width slightly wider than the axial length of the female spiral keys 29 in the coupling member 25. These spiral keys are shown as a right hand thread with a pitch that makes the keys run about 45° across the surface of the shaft. Naturally any other pitch or direction may be selected.

It will now be evident that with the coupling member 25 shifted rearwardly or towards the differential along the splines 23 of the extension 22, the female spiral keys 29 will gradually engage the male keys 31 until the rear faces of the female keys 29 abut against the boss 37, when its axial movement will stop. This position is shown in Figure 4. As the coupling member through the splines 23 and 24 is permanently in engagement with the main shaft 10 and with the latter rotating in clockwise direction, seen from the left end of Figure 1, or as indicated by arrow X, the driven shaft 11 will now commence to revolve in the same direction as indicated by arrow Y, and at the same speed as the driving shaft 10. This then constitutes the third or high speed gear. During the gradual engagement of the spiral keys as just described the rear sleeve portion 28 will run back more and more over the boss 27 and as the latter completely fills the sleeve 28 it acts as a piston therein and forms a dash pot. Small orifices 33 are provided in the sleeve portion 28 for the escape of the compressed air from the dash pot, or for the oil in case the gears run in oil.

As long as the main shaft 10 is revolving at the same or increased speed, the spiral keys 29 and 31 will remain in engagement and, on account of their inclination, will press the coupling member 25 hard against the boss 27 and there will be no strain on the shift gear. Should, however, the speed of the main shaft 10 be slowed down below the speed of the driven shaft 11, then the forces acting on the spiral keys 29 and 31 will have a tendency to release and disengage them from each other, that is to say of shifting the coupling member 25 forward and into neutral position. It will thus be seen that whenever the motor is slowed down the coupling is automatically disengaged even with the clutch in. If thereupon the coupling member is pushed farther forward, so that the female keys 29 become engaged with the male keys 30 on the driven shaft 20, conditions become reversed, so that the latter shaft will revolve the main shaft and run the engine, which will then act as a brake or cooperate with the wheel brakes to stop the car or retard its speed. In either case both shafts continue to run in the same or clockwise direction until the car has stopped, so that this has nothing to do with the backing of the automobile. With this transmission applied to automobile construction the reversing gear, not shown, is preferably placed on the engine end thereof, thereby permitting instant release of all the speed gears in the event of a stalled engine.

In order to shift the coupling member rearward for driving, or forward for retarding the speed of the automobile a suitable shift gear is provided. This consists of a shifting fork 35 fixed on a hollow rod 36, and slidably mounted in a bearing 37 secured on the casing 12 as indicated. This rod may be reciprocated either by electrical or mechanical means, not shown, and may be so connected with the accelerator pedal that when the latter is released the shift gear will set the coupling member 25 in neutral position, as shown in Figure 1. The shift gear also includes an internally grooved ring 38 fitting over the cylindrical cup 22 and axially slidable thereon. The front and rear faces of the ring are gripped by the claws 39 (Figure 2) provided on the prongs or studs 40 of the fork 35. The groove 41 of the ring engage two or more pegs or studs 42 which are permanently fixed in the coupling member 25 and project through longitudinal slots 43 in the cylindrical wall 22.

If now the rod 36 is pushed rearwardly or in the direction of arrow Z, the fork prongs 39 will cause the ring 38 to travel in the same direction bringing the studs 40 and coupling member 25 with it, thereby sliding the male and female spiral keys 31, 29, into engagement and starting the driven shaft 11 to revolve in the same direction as the main shaft 10.

The slots 43 are of sufficient length to permit the coupling member 25 to travel in either direction until abutting either with the boss 27 or 26. Similarly a slot 44 is provided in the wall of the gear casing 12 for the shank of the fork 35.

The low speed gear includes a pinion 47 fixed on the auxiliary shaft 15 and permanently in mesh with teeth 48 on the low gear coupling pinion 49, the ratio being here shown as 1 to 3. A sleeve portion 50 on pinion 49 extends to either side thereof so as to engage both bosses 27 and 51 when standing in its central or neutral position indicated by broken lines in Figure 1. The boss 51 is fixed on the driven shaft 11 and has the same exterior diameter as boss 27 and the interior diameter of the sleeve portion. Similarly to the bosses 26 and 27, the bosses 27 and 51 are spaced apart and male spiral teeth or keys 52 and 53, as before are provided on the driven shaft 11 adjacent to the bosses 27 and 51, respectively with a space or gap 54 left between the two sets of keys. The coupling member 49 is provided with female, spiral teeth or keys 55 adapted for engagement with either of the male keys 52 or 53 which are preferably set at an angle of 45° on the surface of the driven shaft as before. In its central or neutral position, shown in broken lines in Figure 1 and in full lines in Figure 4, the coupling member 49 stands with its female coupling keys 55 over the space or gap 54 so that it is free to rotate independently of the shaft 11.

The shift gear consists of a forked arm 56 with prongs adapted to engage the front and rear faces of the coupling member 49 in order to shift it axially into engagement with either keys 52 or 53, for locking said member to the shaft 11. As in the case of the first described coupling, the fork 56 is here secured on the end of a hollow rod 58 adapted to slide within the rod 36 and actuated in the same manner. A slot 59 for the shank of the fork 56 is provided in the casing 12 of a length sufficient for its total travel in both directions. As before, the sleeve portion 50 forms dash pots with the bosses 27 and 51 in order to cushion the coupling action. Small orifices 33 for the escape of compressed air or oil from the dash pots are provided in the sleeve portion 50.

In Figure 1 the coupling member 49 is shown in its engaged position with the keys 53 of the shaft 11. The latter will accordingly be rotated by the driving shaft 10 in the same direction but at one-fifth of its speed, through the intermediary of the gearing 18, 19, 47 and 48 under the theory that the ratio of speed between the main shaft 10 and the auxiliary shaft is five to three, and between the auxiliary shaft and the coupling member as one to three.

An intermediary or second speed gear is also illustrated in Figure 1. Here the auxiliary shaft is provided with a fixed pinion 60 which meshes with the teeth 61 on a coupling member 62, the gear ratio here being shown as one to one, and the length of this pinion as well as that of pinion 47 is sufficient to assure permanent engagement between the respective gears in whatever position the coupling member stands. Accordingly the latter is always revolving with the main shaft.

As before the coupling member 62 has a sleeve portion 63, one end of which surrounds the boss 51 on the driven shaft 11, while its other end surrounds another boss 64 on said shaft, thus forming dash pots therewith with orifices 65 for the air or fluid provided in the sleeve portion 63. Here again a pair of male spiral key elements 66 and 67, divided by a gap 68, is provided on the driven shaft 11 adjacent to the bosses 51 and 64, and with the coupling member 62 in neutral position, as indicated in Figure 1, corresponding female spiral keys 69 are out of engagement with either of said male key elements. The gap 68 is slightly wider than the width of the coupling member 62 or its keys 69.

In order to shift the coupling member back and forth on the driven shaft, that is to say into engagement with either of the male key elements 66 and 67, a shift gear is furnished, which, as before, consists of a fork 70 with claws 71 for gripping the coupling member. This fork is secured to a shifting rod 72 which is slidably mounted in the hollow rod 58 and actuated in similar manner. The free end of this rod is mounted in bearing 73 on the casing 12.

With gear ratio of one to one between the coupling member 62 and the pinion 60 and the speed of the auxiliary shaft as before three-fifths of the main shaft 10, shaft 11 will now rotate three-fifths of the speed of the main shaft through the intermediary of the gearing 18, 19, 60 and 61, and the female keys 69 in engagement with either of the male key element 67 or 66.

Referring now to Figure 4, the driving shaft here shows the first described coupling member 25 in engagement with the rear key element 31 through the spiral keys 29 with the consequence that the driven shaft 11 rotates at the same speed and in the same direction as indicated by arrows X and Y, in Figure 1. Simultaneously the coupling members 49 and 62 stand in neutral position as shown in this figure, but they are both revolving actuated by their respective pinions 47 and 60 which are continuously revolved with the auxiliary shaft 15 through the gears 18 and 19 by the main shaft 10 as long as the latter itself is revolving.

In Figure 5 the low gear coupling member 49 is shown in engagement with the spiral key element 53 while coupling members 25 and 62 are in neutral positions but idling. In Figure 6 the coupling member 62 is, through its female spiral keys 69, in engagement with the key element 67 so that the shaft 11 runs in second speed, while the other two coupling members 25 and 49 are running idle, being set in neutral position.

In the above three examples the driven shaft 11 has been described as actuated by the main or driving shaft 10 in different, forward speeds. Should it now be desired to retard the forward speed of the car, as when coasting or running down hill, any one of the described transmission gears may be utilized. This is exemplified in Figure 7 of the drawing where the coupling member 62 of the second speed is shown in forward position with its spiral keys in mesh with the forward key element 66. If at this time no gasoline is fed into the engine, the main shaft 10 will drag, but as the driven shaft 11 still retains its speed, it will actuate the main shaft through the sundry gears so that the engine accordingly acts as a brake and retards the forward movement of the automobile. As the forces now act oppositely on the spiral keys to what they did when the latter were in engagement with the rear key element, the tendency is now to press the coupling member hard against the rear surface of the boss 51. There will accordingly be no strain on the shift gear to hold the coupling member in engagement. As soon as the automobile is at a stand-still, but with the motor running, the coupling member is returned to neutral position.

As has already been mentioned, when a reverse gear is needed as on an automobile, motor boat, or the like, this gear is preferably placed ahead of all the forward driving gears. It may be of the same type as the rest of the gears and could have different speeds if required. The only difference would be the addition of an idler gear for reversing the movement.

It will be evident that all the different speed gears may be of the same type, so that instead of the arrangement shown with the high speed coupling member 25 this may be replaced by the type shown in connection with the low speed coupling member 49, in which case another pinion would be required on the auxiliary shaft 15. It will be evident further that the order and ratios of gearings herein disclosed may be inverted or reversed without departing from the essence of the invention. Thus, for instance, the inter-engaging gear wheels 47 and 48 between the driven and counter shafts may be reversed in their ratios. Also these gears may be of the shrouded type, as will be understood.

The advantages possessed by this transmission system as used for automobiles may be briefly summarized:—

Saving in gasoline consumption and greater mileage, on account of the improved coasting feature. Also greater tire mileage, because the free running wheels during coasting set up less friction between drive wheels and road surface.

On account of the gentle shifting from one speed to another depending on the cushioning effect of the spiral key elements in the dash pot, more comfort in riding will be experienced by passengers, all sudden shocks and jerking being eliminated.

There will be less strain on driving parts with consequent longer life of the automobile and less repairs required, this also depending on the soft working key coupling and the compression in the dash pot. There will be no loss of car momentum during the operation of changing gears, and consequently quicker speed acceleration is gained.

The fact that the engine through the back drive of the shafts, may be used as a brake alone or in conjunction with the wheel brakes, will add considerably to the life of the latter. For the same reason added safety is obtained, the braking factor being considerably increased and the stopping of the car made possible in a shorter space of time, because of the fact that it is possible to instantaneously connect up the engine to act as a brake or retarder through any one of the speed gears at the time in action and while the automobile is in motion.

It is to be understood that the invention as here disclosed is not limited to the details of construction shown and described and that these may be varied widely without departing from the spirit of the invention as defined by the claims.

What we claim as new is:—

1. In a power transmission, the combination with driving and driven shafts coaxially disposed; of a member axially slidable as regards the driven shaft, means actuated by the driving shaft for revolving said member and at the same speed, internal spiral teeth on said member and corresponding and spaced sets of external teeth on the driven shaft, and devices for sliding said member in and out of engagement with either set of said shaft teeth.

2. In a power transmission, the combination with driving and driven shafts coaxially disposed; of a member axially slidable as regards the driven shaft, means actuated by the driving shaft for revolving said member, internal spiral teeth on said member and corresponding external teeth on the driven shaft, said shaft teeth being interrupted medially of their extreme ends to form a gap of a length slightly greater than the length of said internal teeth; and devices for sliding said member in and out of said gap to either side thereof to engage said teeth.

3. In a power transmission, the combination with driving and driven shafts coaxially disposed; of a member axially slidable as regards the driven shaft, means actuated by the driving shaft for revolving said member and at the same speed, internal spiral teeth on said member and corresponding external teeth on the driven shaft, said shaft teeth being interrupted medially of their extreme ends to form a gap of a length slightly greater than the length of said internal teeth; and devices for sliding said member to engage said teeth.

4. In a power transmission, the combination with driving and driven shafts coaxially disposed: of a member axially slidable as regards the driven shaft, means actuated by the driving shaft for revolving said member and at the same speed, internal spiral teeth on said member and corresponding external teeth on the driven shaft, and devices for sliding said member in and out of engagement with said shaft teeth; said first means including a sleeve on the driving shaft surrounding said member and having permanent engagement therewith.

5. In a power transmission, the combination with driving and driven shafts coaxially disposed; of a member axially slidable as regards the driven shaft, means actuated by the driving shaft for revolving said member and at the same speed, internal spiral teeth on said member and corresponding external teeth on the driven shaft, said shaft teeth being interrupted medially of their extreme ends to form a gap of a length slightly greater than the length of said internal teeth; and devices for sliding said member to either side thereof to engage said teeth; said first means including a sleeve on the driving shaft surrounding said member and having permanent engagement therewith.

6. In a power transmission, the combination with coaxially arranged driving and driven shafts and an auxiliary shaft arranged parallel with said first shafts; of a member axially slidable as regards the driven shaft, interengaging (spur) gears on the driving and auxiliary shafts, a pinion on the auxiliary shaft, corresponding gear teeth on said sliding member permanently engaging said pinion, male and female spiral teeth on the driven shaft and said member respectively, and means for sliding said member in and out of engagement with said shaft teeth.

7. In a power transmission, the combination with coaxially arranged driving and driven shafts and an auxiliary shaft arranged parallel with said first shafts; of a member axially slidable as regards the driven shaft, interengaging (spur) gears on the driving and auxiliary shafts, a pinion on the auxiliary shaft, corresponding gear teeth on said sliding member permanently engaging said pinion, male and female spiral teeth on the driven shaft and said member respectively; said male teeth being interrupted medially of their extreme ends to form a gap of a length slightly greater than the length of said female teeth, and means for sliding said member to selectively engage said teeth.

8. In a power transmission for variable speed, the combination with coaxially arranged driving and driven shafts, and an auxiliary shaft arranged parallel with said first shafts; of members axially slidable as regards the driven shaft, interengaging (spur) gears on the driving and auxiliary shafts, pinions on the auxiliary shaft, corresponding gear teeth on said sliding members permanently engaging said pinions, male and female spiral teeth on the driven shaft and said members respectively, and means for sliding said members in and out of engagement with said shaft teeth.

9. In a power transmission for variable speed, the combination with coaxially arranged driving and driven shafts and an auxiliary shafts arranged parallel with said first shafts; of members axially slidable as regards the driving shaft, interengaging (spur) gears on the driving and auxiliary shafts, pinions on the auxiliary shaft, corresponding gear teeth on said sliding members permanently engaging said pinions, male and female spiral teeth on the driven shaft and said members respectively; said male teeth being interrupted medially of their extreme ends to form a gap of a length slightly greater than the length of said female teeth, and means for sliding said members to selectively engage said teeth.

10. In a power transmission, the combination with driving and driven shafts; of a sleeve member axially slidable as regards the driven shaft, means actuated by the driving shaft for revolving said member, internal spiral teeth on said member and corresponding external teeth on the driven shaft, collars on the driven shaft symmetrically arranged as regards the spiral teeth thereon and forming dash pots with said sleeve, and devices for sliding said member in and out of engagement with said shaft teeth.

11. In a power transmission, the combination with driving and driven shafts coaxially disposed; of a sleeve member axially slidable as regards the driven shaft, means actuated by the driving shaft for revolving said member, internal spiral teeth on said member and corresponding external teeth on the driven shaft, collars on the driven shaft symmetrically arranged as regards the spiral teeth thereon and forming dash pots with said sleeve, said shaft teeth being interrupted medially of their extreme ends to form a gap of a length slightly greater than the length of said internal teeth; and means for sliding said member to selectively engage said teeth.

12. In a gearing transmission the combination of a driving shaft, an alined driven shaft, male spiral clutch elements on one of said shafts, a female and spiral shiftable clutch element on the other shaft operable to engage with either of said male clutch elements, and means for shifting said female clutch element, substantially as set forth.

13. In a gearing transmission the combination of alined shafts, cooperable male and female clutch elements on said shafts respectively, a collar associated with one of said clutch elements, and an apertured sleeve portion associated with the other clutch element cooperable with said collar to provide a dash pot when the clutch elements are brought into engagement, substantially as set forth.

14. In a gearing transmission the combination of alined driving and driven shafts, two pairs of spaced clutch elements on one of said shafts, complementary clutch elements located intermediate said spaced clutch elements respectively, a driving connection between one of said intermediate clutch elements and the driving shaft, a counter shaft connected to the driving shaft, a driving connection between the counter shaft and the other intermediate clutch element, and means for selectively shifting said intermediate clutch elements, substantially as set forth.

15. In a gearing transmission the combination of alined driving and driven shafts, a plurality of pairs of spaced clutch elements on one of said shafts, a plurality of complementary clutch elements located intermediate said spaced clutch elements respectively, a positive driving connection between the driving shaft and one of said intermediate clutch elements, counter-shaft driving connections between the driving shaft and the other of said intermediate clutch elements, and means for selectively shifting said intermediate clutch elements, substantially as set forth.

In witness whereof, we have hereunto set our hands at Baltimore, Maryland, this 15 day of March, A. D. nineteen hundred and twenty-nine.

EDWARD D. BIERETZ.
JOHN J. NEAL.